United States Patent
Iwai et al.

(10) Patent No.: US 8,184,639 B2
(45) Date of Patent: May 22, 2012

(54) COMMUNICATION DEVICE SUITABLE FOR SETTING IP ADDRESS OF SERVER CONNECTED TO NETWORK, NETWORK PARAMETER SETTING METHOD AND NETWORK PARAMETER SETTTING PROGRAM PRODUCT

(75) Inventors: Toshimichi Iwai, Kitakatsuragi-gun (JP); Junichi Hase, Osaka (JP); Yoshikazu Ikenoue, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 228 days.

(21) Appl. No.: 12/697,323

(22) Filed: Feb. 1, 2010

(65) Prior Publication Data
US 2010/0138906 A1    Jun. 3, 2010

Related U.S. Application Data

(63) Continuation of application No. 11/007,670, filed on Dec. 9, 2004, now Pat. No. 7,672,311.

(30) Foreign Application Priority Data
Sep. 10, 2004  (JP) ................................. 2004-264284

(51) Int. Cl.
*H04L 12/28* (2006.01)
(52) U.S. Cl. .................................. 370/395.3; 370/401
(58) Field of Classification Search ................. 370/389, 370/395.31, 395.32, 255, 252, 401, 402, 370/254, 395.3, 395.52, 420
See application file for complete search history.

(56) References Cited

U.S. PATENT DOCUMENTS

| 6,247,055 | B1 | 6/2001 | Cotner et al. | |
|---|---|---|---|---|
| 6,496,859 | B2 | 12/2002 | Roy et al. | |
| 6,671,720 | B1 | 12/2003 | Cheston et al. | |
| 6,738,817 | B1 | 5/2004 | Chen et al. | |
| 6,754,709 | B1 | 6/2004 | Gbadegesin | |
| 7,664,855 | B1* | 2/2010 | Freed et al. | 709/225 |
| 7,957,372 | B2* | 6/2011 | Boulanger et al. | 370/389 |
| 2002/0083342 | A1 | 6/2002 | Webb et al. | |
| 2002/0174208 | A1 | 11/2002 | Morlitz | |
| 2005/0135370 | A1* | 6/2005 | Kim | 370/392 |

FOREIGN PATENT DOCUMENTS

| JP | 09-261274 | 10/1997 |
|---|---|---|
| JP | 2000-194513 | 7/2000 |
| JP | 2001-274806 | 10/2001 |
| JP | 2002-198968 | 7/2002 |

(Continued)

OTHER PUBLICATIONS

Notice of Ground of Rejection issued by the Japanese Patent Office on Aug. 29, 2006, in corresponding JP Application No. 2004-264284.
Japanese Official Final Decision for Rejection dated Mar. 26, 2007.

*Primary Examiner* — Brenda H Pham
(74) *Attorney, Agent, or Firm* — Buchanan, Ingersoll & Rooney PC

(57) ABSTRACT

In order to easily set IP addresses required for communicating with apparatuses connected to a network, an MFP includes a port scan unit for acquiring, by port scanning, an IP address of a server having a predetermined port open from one of the servers connected to the network, and a network environment storage part for storing a set of acquired IP address and a port number of the predetermined port.

15 Claims, 14 Drawing Sheets

FOREIGN PATENT DOCUMENTS

| | | |
|---|---|---|
| JP | 2002-335270 | 11/2002 |
| JP | 2002-366502 | 12/2002 |
| JP | 2003-058443 | 2/2003 |
| JP | 2003-085059 | 3/2003 |
| JP | 2004-030287 | 1/2004 |
| JP | 2004-126959 | 4/2004 |

* cited by examiner

|   | PORT NUMBER | OBJECTS FOR NETWORK SERVICES | IP ADDRESS |
|---|---|---|---|
| 1 | 21 | FTP SERVER (Scan to FTP DESTINATION) |  |
| 2 | 25 | SMTP SERVER |  |
| 3 | 53 | DNS SERVER |  |
| 4 | 110 | POP3 SERVER |  |
| 5 | 389 | LDAP SERVER |  |

F I G. 8

```
SCANNING IP ADDRESS SETTING

◉ MANUAL SETTING
      START  | 192. 168.   8.   0 |
      END    | 192. 168.  15. 255 |

○ AUTOMATIC SETTING
      ALL ADDRESSES IN SUBNET ARE SCANNED

| STORING OF |
                                    | SETTING    |
```

FIG. 10

NETWORK PARAMETER SETTING

21: FTP SERVER (Scan DESTINATION)  1/7

192. 168.  0.  10  :NIC-SERV
192. 168.  0.  33  :PC005
192. 168.  0. 147  :PC072
192. 168.  1.  42  :DEV13-SERV
192. 168.  1. 213  :PC123

25: SMTP SERVER 192. 168.  0.  10  :NIC-SERV
192. 168.  0. 113  :DEV12-SERV
192. 168.  1.  67  :MLT01234

| PREVIOUS PAGE | NEXT PAGE | STORING OF SETTING |

FIG. 13

EXEMPLARY PACKET DATA

PACKET DATA FORMAT

| THE NUMBER OF BYTES FROM HEAD | DESCRIPTION | CONCRETE EXAMPLE |
|---|---|---|
| 13, 14 BYTES | TYPE OF PROTOCOL | 0x0800: IP PROTOCOL |
| 24 BYTES | TYPE OF PROTOCOL ON IP | 0x06: TCP PROTOCOL |
| 27~30 BYTES | Source IP ADDRESS | 0xC0A80D0A: 192.168.100.10 |
| 31~34 BYTES | Destination IP ADDRESS | 0xC0A80D14: 192.168.100.20 |
| 35, 36 BYTES | Source PORT NUMBER | 0x006E: 110th PORT |
| 37, 38 BYTES | Destination PORT NUMBER | 0x0400: 1024th PORT |

PACKET DATA STORAGE UNIT

| NUMBER | Source IP ADDRESS | Source PORT NUMBER | Destination IP ADDRESS | Destination PORT NUMBER |
|---|---|---|---|---|
| 1 | 0xC0A80D0A | 0x006E | 0xC0A80D14 | 0x0400 |
| 2 | 0xC0A80D14 | 0x0400 | 0xC0A80D0A | 0x006E |
| 3 | | | | |
| ... | | | | |

COMMUNICATION DEVICE SUITABLE FOR SETTING IP ADDRESS OF SERVER CONNECTED TO NETWORK, NETWORK PARAMETER SETTING METHOD AND NETWORK PARAMETER SETTTING PROGRAM PRODUCT

CROSS-REFERENCE TO RELATED APPLICATIONS

This application is a continuation of application Ser. No. 11/007,670, filed Dec. 9, 2004, which claims the priority of Japanese Patent Application No. 2004-264284, filed with the Japan Patent Office on Sep. 10, 2004, the entire content of which is hereby incorporated by reference.

BACKGROUND OF THE INVENTION

1. Field of the Invention

The present invention relates to a communication device, a network parameter setting method and a network parameter setting program product. More particularly, the present invention relates to a communication device suitable for setting an IP address of a server connected to a network, a network parameter setting method and a network parameter setting program product.

2. Description of the Related Art

In recent years, there have been developed copying apparatuses equipped with E-mail sending/receiving functions and file transfer functions. These copying apparatuses are connected to local area networks (LAN) for use. In connecting a copying machine to a network, the setting of network environment must be performed. The setting of network environment means, in addition to assigning an IP address to the copying machine to be connected to the network, registering an IP address of a SMTP (Simple Mail Transfer Protocol) for sending E-mails in order to make the E-mail sending function effective.

Japanese Laid-Open Patent Publication No. 2001-274806 discloses an information processing device which facilitates the operation for assigning an IP address to a copying machine to be connected to a network. Japanese Laid-Open Patent Publication No. 2001-274806 discloses an information processing device including a packet capturing portion for acquiring packets from a network 200, a packet analysis unit for extracting network parameters from the acquired packets, a storage unit for constructing and storing an input-supporting data base containing usage information regarding the usage of the extracted network parameters in the network, and a control panel for creating and displaying a user interface image plane for setting network parameters in the information processing device 10 based on the aforementioned usage information contained in the input-supporting data base.

The information processing device disclosed in Japanese Laid-Open Patent Publication No. 2001-274806 can facilitate the operation for registering an IP address assigned to the information processing device. However, the registration thereof can not be performed when the IP address of a server connected to the network, for example, a SMTP server, is unknown.

SUMMARY OF THE INVENTION

The present invention has been made in order to overcome the aforementioned problems. It is an object of the present invention to provide a communication device, a network parameter setting method and a network parameter setting program product capable of easily setting an IP address required for communicating with an apparatus connected to a network.

In order to attain the aforementioned objects, according to an aspect of the present invention, a communication device connected to a network includes an IP address acquisition unit for acquiring an IP address of an apparatus having a predetermined port open from one of apparatuses connected to the network; and a storage unit for storing a set of the acquired IP address and a port number of the predetermined port.

Preferably, the communication device includes a display unit for displaying a set of the acquired IP address and a port number of the predetermined port; and a selection reception unit for receiving a selection of the displayed set of the IP address and the a port number, wherein the storage unit stores the selected set of the IP address and the port number.

According to another aspect of the present invention, a network environment setting method is executed in a computer connected to a network. The method includes the steps of: acquiring an IP address of an apparatus having a predetermined port open form one of apparatuses connected to the network; and setting, according to a set of the acquired IP address and a port number of the predetermined port, the IP address to an application program which uses this port number.

According to another aspect of the present invention, a network environment setting program is executed in a computer connected to a network. The program causes the computer to execute the steps of: acquiring an IP address of an apparatus having a predetermined port open from one of apparatuses connected to the network; and setting, according to a set of the acquired IP address and a port number of the predetermined port, the IP address for an application program which uses the port number.

According to the present invention, an IP address of an apparatus having a predetermined port open from one of apparatuses connected to the network is acquired and a set of the acquired IP address and a port number of the predetermined port is stored. Therefore, even if an IP address of an apparatus having a predetermined port open is unknown, the IP address required for communicating with the apparatus can be set. As a result, it is possible to provide communication devices, network parameter setting methods and network parameter setting program products capable of easily setting IP address required for communicating with apparatus connected to a network.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a view illustrating an exemplary scanning range setting image plane;

FIG. 10 is a view illustrating an exemplary network parameter setting image plane displayed on the display unit in the network parameter setting process;

FIG. 13 is a view illustrating an example of packet data flowing through a network;

FIG. 14 is a view illustrating an exemplary format of packet data;

DESCRIPTION OF THE PREFERRED EMBODIMENTS

Figure 1:
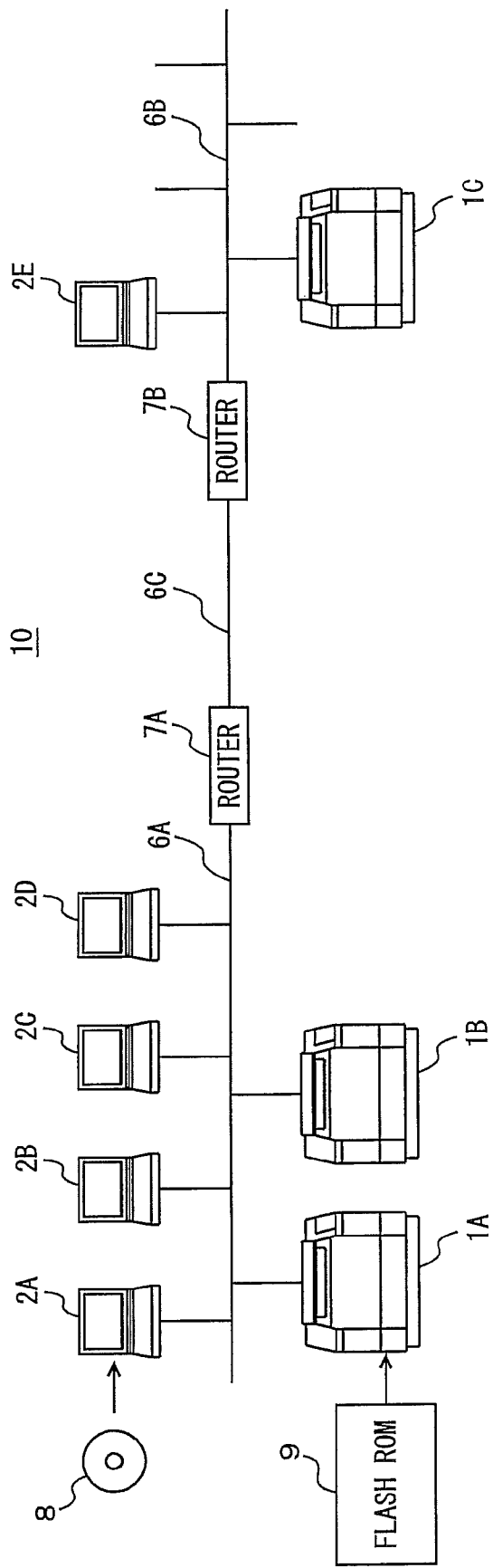
FIG. 1 is a view illustrating the entire structure of the network system according to one embodiment of the present invention.

Hereinafter, embodiments of the present invention will be described with reference to the drawings. In the following description, the same or similar components are designated by like reference characters. The designations and the functions are also identical. Therefore, detail description thereof will not be repeated.

FIG. 1 is a view illustrating the general outline of a network system according to one of embodiments of the present invention. Referring to FIG. 1, the network system 10 includes multi function peripherals (hereinafter, referred to as "MFPs") 1A and 1B, servers 2A, 2B, 2C and 2D which are connected to a network 6A, and a MFP 1C and a server 2E which are connected to a network 6B. Network 6A is connected to a network 6C through a router 7A. Network 6C is connected to network 6B through a router 7B.

Servers 2A, 2B are mail servers for managing the reception and transmission of E-mails. Server 2A is a SMTP server for managing the transmission of E-mails. Therefore, server 2A opens a 25th port. Server 2B is a POP (Post Office Protocol) 3 server for managing the reception of E-mails. Therefore, server 2B opens a 110th port.

Server 2C is a DNS (Domain Name System) server. Server 2C manages a data base describing the correspondence between host names and IP addresses, and enables referring to a host name from an IP address, in response to requirement from a client. Therefore, server 2C opens a 53rd port.

Server 2D is a FTP (File Transfer Protocol) server. Server 2D receives and stores files in response to requirement from clients. Therefore, server 2D opens a 21st port.

Server 2E is a LDAP (Lightweight Directory Access Protocol) server. Server 2E provides a directory service for allowing clients to access a directory compatible with X.500. Therefore, server 2E opens a 389th port.

The port numbers opened by servers 2A to 2E are numbers which are publicly predetermined in correspondence with application programs executed by them.

While there is described an example where servers 2A to 2D are connected to network 6A and server 2E is connected to network 6B, all servers 2A to 2E may be connected either to network 6A or to network 6B. It is unnecessary that servers 2A to 2E are connected to the network to which MFPs 1A, 1B and 1C are connected. It is necessary only that servers 2A to 2E are connected through a connecting apparatus such as a router to a network which is connected to the network to which MFPs 1A, 1B and 1C are connected.

MFPs (Multi Function Peripherals) 1A, 1B and 1C include a scanner for reading manuscripts, an image generating apparatus for generating images on recording media, such as papers, based on image data and a facsimile. MFPa1A, 1B and 1C have an image reading function, a copying function, a facsimile sending/receiving function and a printing function for printing data. MFPs 1A, 1B and 1C have the same functions and therefore MFP 1A will be described as an example unless otherwise mentioned.

The number of MFPs 1A, 1B and 1C, PCs 2A to 2E is not limited to that illustrated in FIG. 1.

In order to connect MFP 1A to network 6A and enable communication between MFP 1A and servers 2A to 2E, the network environment of MFP 1A must be set. The setting of network environment includes a process for setting (storing) the IP addresses of servers 2A to 2E, as well as a process for setting the IP address of MFP 1A itself.

Therefore, MFP 1A performs a port scanning when it is installed and first powered-on, when it is connected to network 6A, or when a user inputs an instruction for the setting of network environment. The port scanning is a process for searching for the IP addresses of apparatuses which open ports for communicating with application programs installed in MFP 1A. Then, the IP addresses for respective port numbers acquired by the port scanning are stored.

A detachable flash ROM 9 is mounted to MFP 1A. Programs stored in this flash ROM 9 are executed by the central processing unit (CPU) included in MFP 1A. Instead of reading programs out of flash ROM 9, programs may be stored in EEPROM (Electrically Erasable/Programmable Read Only Memory). MFP 1 executes programs stored in the EEPROM with the CPU. The content stored in the EEPROM can be rewritten or an additional content can be written thereto. Therefore, other computers connected to networks 6A, 6B and 6C can rewrite programs stored in the EEPROM of MFP 1A or additionally write a new program therein. Further, MFP 1A can download programs from other computers connected to networks 6A, 6B and 6C and store the programs in the EEPROM.

Networks 6A and 6B are local area networks (LAN). Network 6C is the internet or the public switched telephone network. Networks 6A, 6B and 6C may be either wired or wireless.

While there will be described an example where programs which are executed by MFP 1A are stored in flash ROM 9 and distributed, there may be employed other recording media such as flexible discs, cassette tapes, CD-ROMs, hard discs, optical discs (MO (Magnetic Optical Discs)/MD (Mini Discs)/DVD (Digital Versatile Discs)), IC cards (including memory cards), optical cards or semiconductor memories such as mask ROMs, EPROMs, EEPROMs which fixedly carry programs. Also, programs may be downloaded from other devices through network 6A.

The programs described herein include source-program-formed programs, compression-processed programs, coded programs, etc., as well as programs which can be executed directly by the CPU.

Figures 2, 3:
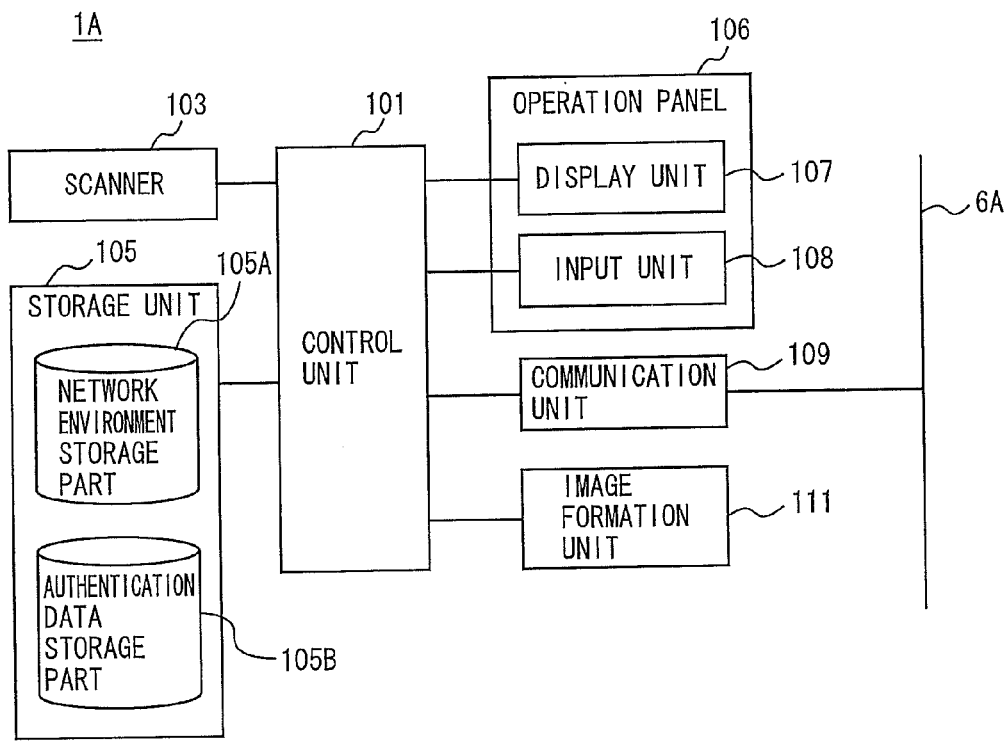
FIG. 2 is a functional block diagram illustrating the general structure of a MFP according to the present embodiment.
FIG. 3 is a view illustrating an example of the network environment data list stored in the network environment storage part.

FIG. 2 is a functional block diagram illustrating the general structure of the MFPs according to the present embodiment. Referring to FIG. 2, MFP 1A includes a control unit 101 for controlling the entire MFP 1A, a scanner 103 for optically reading manuscripts and outputting image data, a storage unit 106 which is a storing device such as a hard disc, an operation panel 106 which receives user's operation, a communicating portion 109 for connecting control unit 101 to network 6A, and an image formation unit 111 for generating images on recording media such as papers.

Scanner 103 includes a photoelectric conversion device such as a CCD (Charge Coupled Device) and optically reads manuscripts and outputs image data as electronic data. Image data output from scanner 103 is output to storage unit 105. At this time, when a user ID and a password are input, the image data is stored in a box provided in storage unit 105 in correspondence with the user ID.

Operation panel 106 includes an input unit 108 for receiving input generated by user's operation and a display unit 107 for displaying predetermined information.

Storage unit 105 is a storing device such as a hard disc. Storage unit 105 may be a semiconductor memory such as a random access memory (RAM). Storage unit 105 includes a network environment storage part 105A and an authentication data storage part 105B. Network environment storage part 105A stores network parameters. Network parameters are data which associates port numbers with IP addresses. Port numbers are predetermined numbers. In the state where network parameters have not been set yet for MFP 1A, only predetermined port numbers may be stored and in the state where network parameters have been set, the acquired IP addresses may be stored in association with the port numbers. Preferably, network environment storage part 105A stores sets of a port number and an IP address in correspondence with application programs installed in MFP 1A.

FIG. 3 is a view illustrating an example of network environment data stored in network environment storage part 105A. Referring to FIG. 3, a port number of 21 is associated with the FTP server which offers a network service for file transfer, and a port number of 25 is associated with the SMTP server which offers a network service for E-mail transmission. Further, a port number of 53 is associated with the DNS server which offers a DNS network service, and a port number of 110 is associated with the POP3 server which offers a network service for E-mail reception. Further, a port number of 389 is associated with the LDAP server which offers a directory service. FIG. 3 illustrates network environment data before the network parameters for MFP 1A are set. Therefore, the boxes for IP addresses are blank, which indicates that the respective port numbers are not associated with IP addresses. While in the figure there is illustrated an example where port numbers are associated with IP addresses in a one-to-one relationship, a plurality of IP addresses may be associated with a single port number. In this case, the network environment data is increased by the number of increased IP addresses. For example, this is effective in the case where there are a plurality of FTP servers. Also, for port numbers for which only a single server is allowed to be set, there may be provided network environment data which associates a plurality of IP addresses with a single port number and a single IP address may be identified through user's selection, thus eliminating the other network environment data.

Returning to FIG. 2, authentication data storage part 105B stores authentication data for user authentication. The authentication data is identification information for identifying a user and includes a user ID and a password. The authentication data is prestored by an administrator, etc., of MFP 1A.

Further, storage unit 105B stores images read by scanner 103 and received facsimile data as electronic data with them classified in boxes.

Communicating portion 109 is a communication interface for connecting MFP 1A to network 6A. Image formation unit 111 visualizes, on papers, image data read by scanner 103, image data received from other computers through communicating portion 109 and data stored in storage unit 105.

Figure 4:
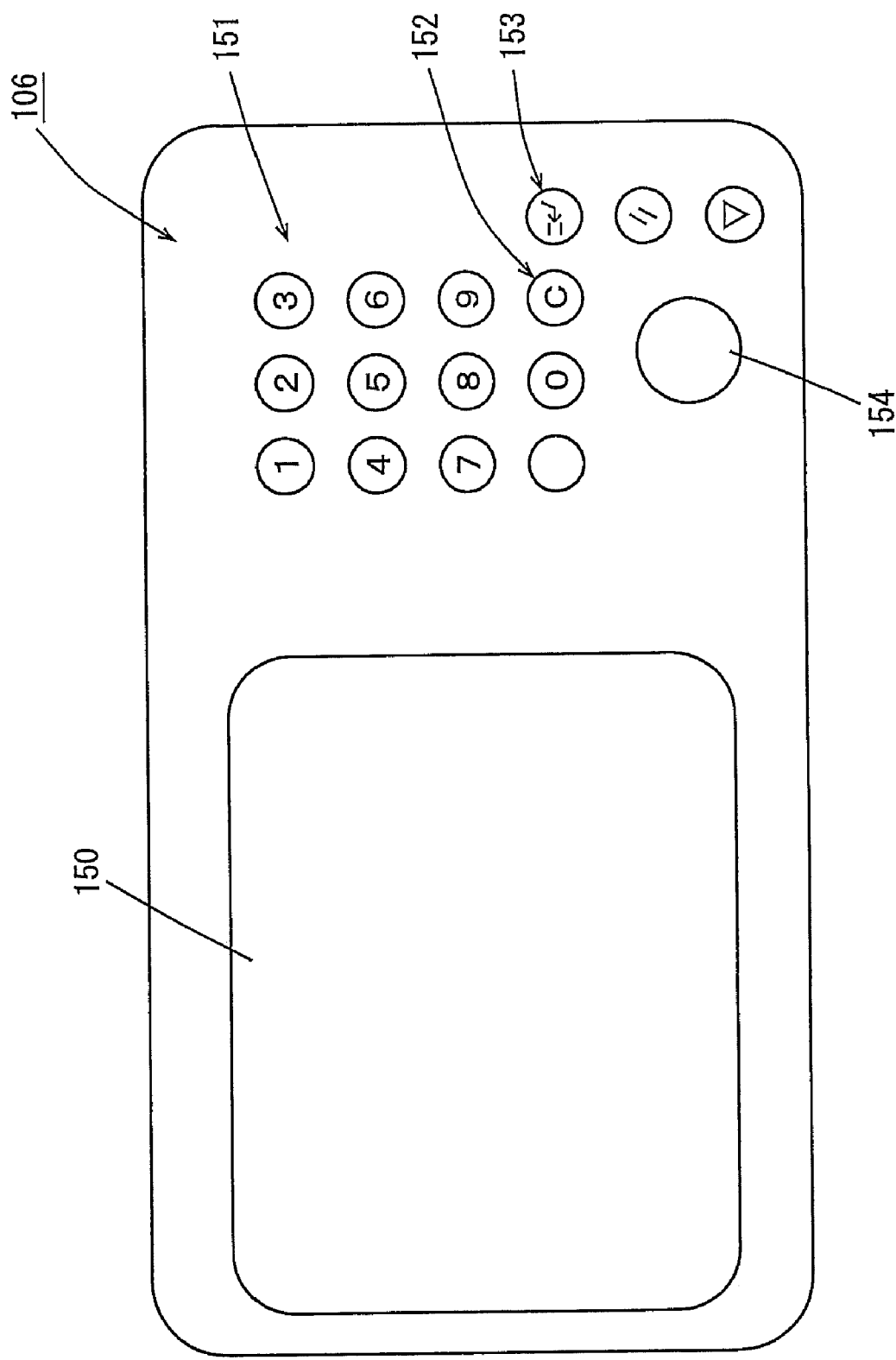
FIG. 4 is a plan view of an operation panel 106.

FIG. 4 is a plan view of operation panel 106. Referring to FIG. 4, operation panel 106 is provided with a liquid crystal touch panel 150, ten keys 151, a clear key 152 for returning a set value to an initial value, an interrupt key 153 for performing interrupt copying, and a start key 154 for commanding the start of reading images. Liquid crystal touch panel 150 is formed from a liquid crystal display device and a touch panel formed from a transparent member and stacked on the liquid crystal display device. The liquid crystal display panel corresponds to the display unit. Touch panel 150, ten keys 151, clear key 152, interrupt key 153 and start key 154 correspond to the input unit 108. By displaying instruction buttons on the liquid crystal display device and detecting the instruction of the buttons on the touch panel, various operations are made possible. The operation panel 106 displays, on MFP 1A, a log-in image plane for receiving log-in operation performed by the user to receive the input of a user ID and a password.

Figure 5:
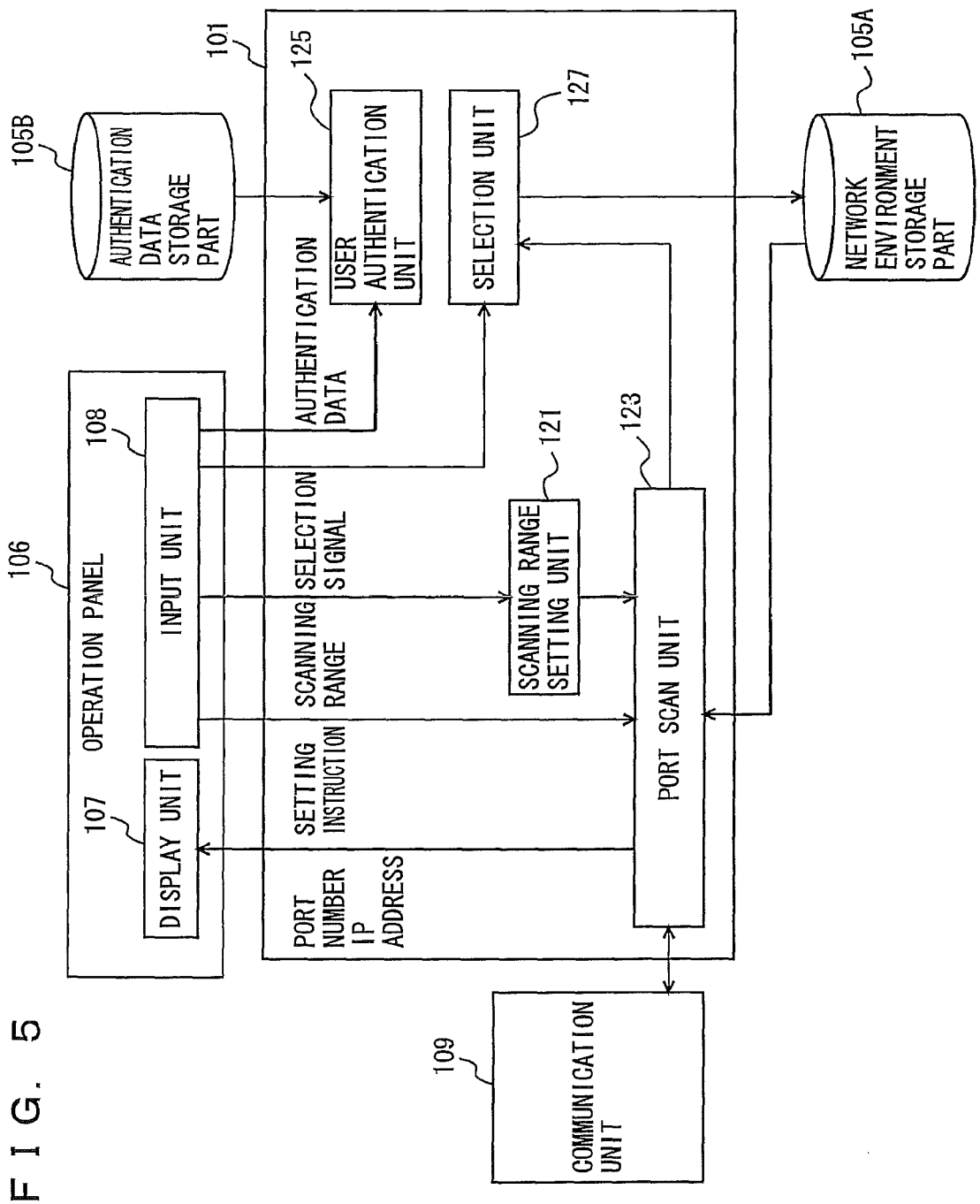
FIG. 5 is a functional block diagram illustrating the detail structure of the control unit of the MFP according to the present embodiment.

FIG. 5 is a functional block diagram illustrating the detail structure of the control unit of the MFP according to the present embodiment. Referring to FIG. 5, control unit 101 includes a scanning range setting unit 121 for setting the range of IP addresses to be scanned, a port scan unit 123 connected to communicating portion 109 for performing port scanning, a user authentication unit 125 connected to authentication data storage part 105B for authenticating users and a selection unit 127 connected to network environment storage part 105A for storing sets of an IP address and a port number.

User authentication unit 125 is connected to operation panel 106. Identification information (user ID) input by a user to input unit 108 of operation panel 106 is input to user authenticating portion 125. User authenticating portion 125 is connected to authenticating data storage unit 105B. User authenticating portion 125 compares identification information input from input unit 108 with identification information prestored in authentication data storage part 105B. If the comparison has revealed that the both are in agreement with each other, it is determined that the user is a true user and if the both are not in agreement, it is determined that the user is not a true user. The result of user authentication is output to port scan unit 123 and port scan unit 123 performs port scanning which will be described later, only when the result of user authentication indicating that the user is a true user is input. Identification information is information for identifying a user and includes a user ID and a password.

Scanning range setting unit 121 sets the range of IP addresses which is scanned by port scan unit 123. The range of scanning is input by the user through input unit 108. Scanning range setting unit 121 displays a range setting image plane on display unit 107 and outputs the range of IP addresses input to input unit 108 according to the range setting image plane to port scan unit 123. The specification of the range of scanning includes a method for specifying the upper limit and lower limit of IP addresses, a method for specifying the range of the lowest one byte or the range of the lowest two bytes of the IP address and a method for specifying sub addresses.

The range of IP addresses is input to port scan unit 123 from scanning range setting unit 121. Further, a setting instruction for starting the setting of network environment is input to port scan unit 123 from input unit 108. This setting instruction is input by the user. Then, in response to the input of setting instruction, port scan unit 123 determines whether or not ports are opened, for all of the IP addresses in the range of IP addresses which has been input from scanning range setting unit 121. The ports are acquired from the network environment data described in network environment storage part 105A. When there are a plurality of port numbers pre-stored in network environment storage part 105A, it is determined whether or not all the ports are opened. Port scan unit 123 outputs, to display unit 107, sets of a port number determined from the determination to be opened and the IP address. Display unit 107 displays a port number and an IP address which were input, for each port number.

Selection unit 127 is connected to input unit 108 and receives selection signals from the input unit. The selection signals are signals which are input by the user. The user looks sets of a port number and an IP address displayed on display unit 107 and specifies which one of the sets is selected. A selection signal identifying the set of a port number and an IP address selected by the specification is output to selection unit 127. Selection unit 127 is connected to port scan unit 123 and receives sets of a port number and an IP address from port scan unit 123. Selection unit 127 selects a set of a port number and an IP address corresponding to the selection signal input from input unit 108, from the sets of a port number and an IP address input from port scan unit 123. Then, selection unit 127 stores the selected set of a port number and an IP address in network environment storage part 105A. Thus, the IP address is provided in a box for an IP address in the network storing data. When there are a plurality of port numbers, network environment data for the port numbers is added and IP addresses are added to the IP address of the added network environment data.

While there has been described an example where operation panel 106 is used as the input/output interface between MFP 1A and a user in MFP 1A according to the present embodiment, MFP 1A may be remotely operated from a computer connected to network 6A and the computer for remote operation may be used as the input/output interface between MFP 1A and a user.

Figure 6:
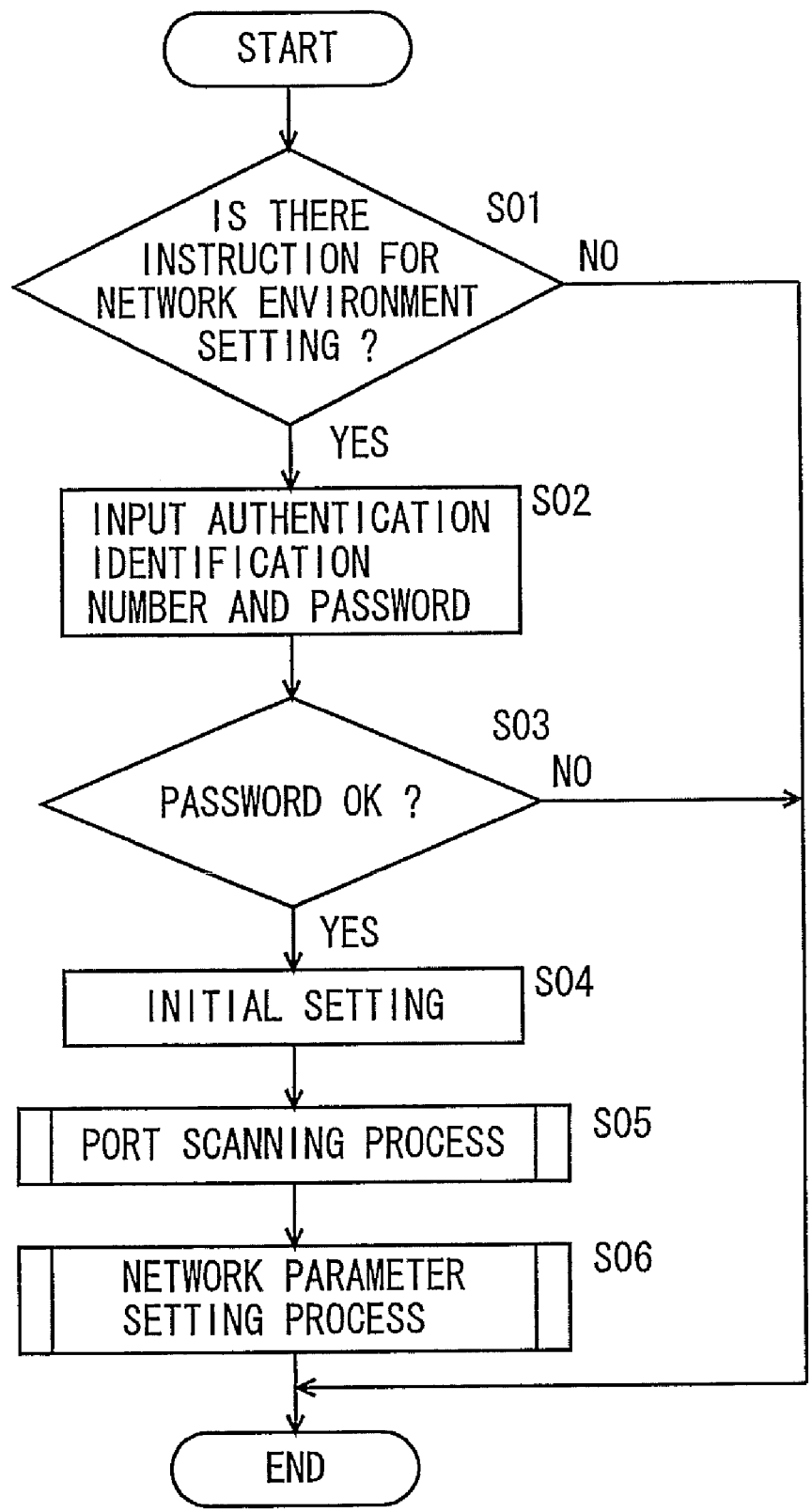
FIG. 6 is a flowchart illustrating the flow of the network environment setting processes which is executed in the MFP according to the present embodiment.

FIG. 6 is a flowchart illustrating the flow of a network environment setting process which is executed in the MFP according to the present embodiment. Referring to FIG. 6, in MFP 1A, it is determined whether or not a setting instruction for instructing the start of network environment setting has been input through input unit 108 (step S01). If the setting instruction has been input, the process proceeds to step S02. If not, the process ends.

In step S02, the input of an identification number and a password for user authentication is received. An authentication image plane for inputting an identification number and a password is displayed on display unit 107 of operation panel 106. An identification number and a password which have been input by a user through input unit 108 according to the authentication image plane are received. Then, it is determined whether or not a password corresponding to the identification number in the authentication data stored in authentication data storage part 105B is in agreement with the received password (step S03). If the password is in agreement, the process proceeds to step S04. If it is not in agreement, the process ends. Namely, only the user of the identification number which is stored, together with a password, in authentication data storage part 105B can execute the network environment setting process. Therefore, users who can execute the network environment setting process in MFP 1A can be restricted to particular users.

In step S04, an initial setting is performed. The initial setting includes a process for specifying the position (for example, the IP address) of MFP 1A on the network, a process for setting a subnet mask, or a process for setting a gateway, etc. An initial setting image plane is displayed on display unit 107 of operation panel 106. Data input by the user through input unit 108 according to the initial setting image plane is received and then stored in network environment storage part 105A.

Then, after the initial setting, the port scanning process is executed and thus IP addresses are acquired for respective port numbers (step S05). Then, the network parameter setting process for storing a set of a port number and an IP address specified by the user, out of the acquired IP addresses for the respective port numbers, in network environment storage part 105A is executed (step S06).

Figure 7:
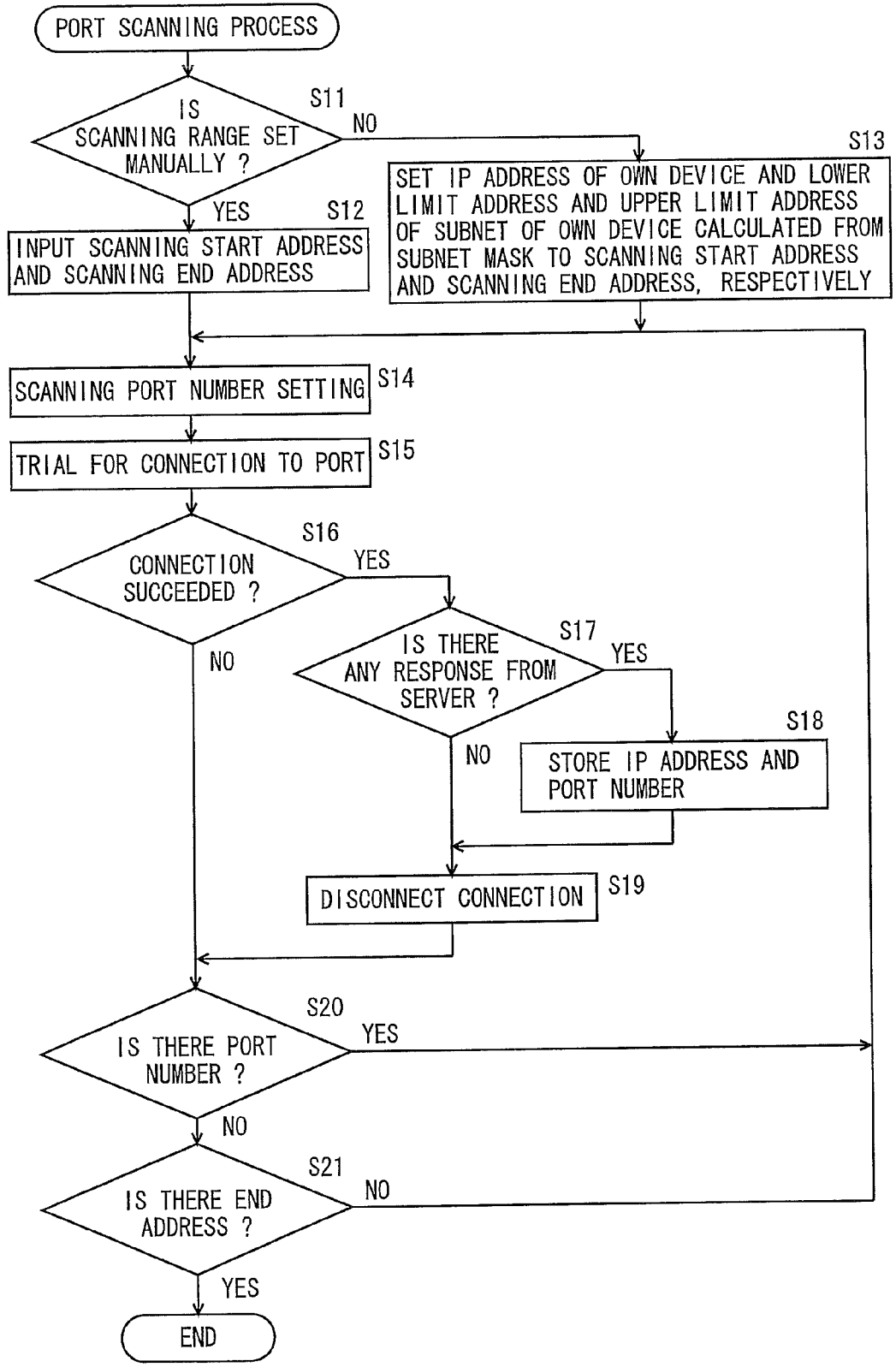
FIG. 7 is a flowchart illustrating the flow of the port scanning process which is executed in step S06 of FIG. 6.

FIG. 7 is a flowchart illustrating the flow of the port scanning process which is executed in step S05 of FIG. 6. Referring to FIG. 7, the input of the scanning range which is the range of IP addresses to be subjected to port scanning is received and the received scanning range is set (step S11 to step S13). The setting of scanning range includes manual setting and automatic setting. The manual setting refers to a process for setting the scanning range by specifying the start address and the end address for port scanning. The automatic setting refers to a process for setting all the IP addresses in the subnet as the scanning range. In step S11, a scanning range setting image plane is displayed on display unit 107 and data input by the user through input unit 108 according to the scanning range setting image plane is received. Then, according to the data, it is determined whether or not it is manual setting. If it has been determined that it is manual setting, the process proceeds to step S12. If not, the process proceeds to step S13. In step S12, the input of the start address and the end address is received. In step S13, the start address and the end address are calculated from the IP address of MFP 1A and the subnet mask set in the initial setting process. More specifically, the lower limit address of the subnet to which MFP 1A belongs is set as the start address and the upper limit address of this subnet is set as the end address.

FIG. 8 is a view illustrating an example of the scanning range setting image plane. Referring to FIG. 8, the scanning range setting image plane includes a radio button for specifying manual setting, a box for inputting a start address, a box for inputting the end address, a radio button for specifying automatic setting, and an instruction button indicating the characters of the storing of setting. When the user selects the radio button for specifying manual setting, a start address and end address input to the box for inputting the start address and the box for inputting the end address, respectively, are made effective and are output to port scan unit 123.

When the user selects the radio button for specifying automatic setting, all the IP addresses in the subnet are output to port scan unit 123.

Referring to FIG. 7, in step S14, a port number for scanning is set. This port number is set by reading, in order, the network environment data stored in network environment storage part 105A.

Then, in step S16, packet data requiring the connection at the port number set in step S15 is output to network 6A with the transmission control protocol (TCP), using an IP address in the scanning range set in step S14 as the destination. This packet is a SYN packet of three-way handshake which is well known in the TCP. Then, whether or not the connection was succeeded is determined by determining whether or not the three-way handshake was succeeded. If it was succeeded, the process proceeds to step S17. If not, the process proceeds to step S19.

In step S17, it is determined whether or not a greeting message has been sent from the server within a predetermined time interval (for example, 10 seconds). The greeting message is a respond message which is sent from the server when connection is established. The greeting message is predetermined for each protocol and, for example, the greeting message is "OK" in POP, and "220" in SMTP. If there was a response from the server, the process proceeds to step S18. If not, the process skips step S18 and proceeds to step S19. In step S18, the set of IP address and port number included in the requirement packet sent in step S16 is temporally stored as candidate parameters. In step S19, the connection with the server is disconnected and then the process proceeds to step S20.

In step S20, it is determined whether or not there is a next port number. If there is a port number for which a requirement packet has not been sent yet, the port number is set as the port number to be processed and the process returns to step S14. If there is no port number, the process proceeds to step S21.

In step S21, it is determined whether or not the IP address which is processed is the end address. Hit is the end address, the process ends. If it is not the end address, the IP address which is processed is incremented by 1 and the incremented IP address is set as a new address to be processed, and then the process returns to step S14.

Figure 9:
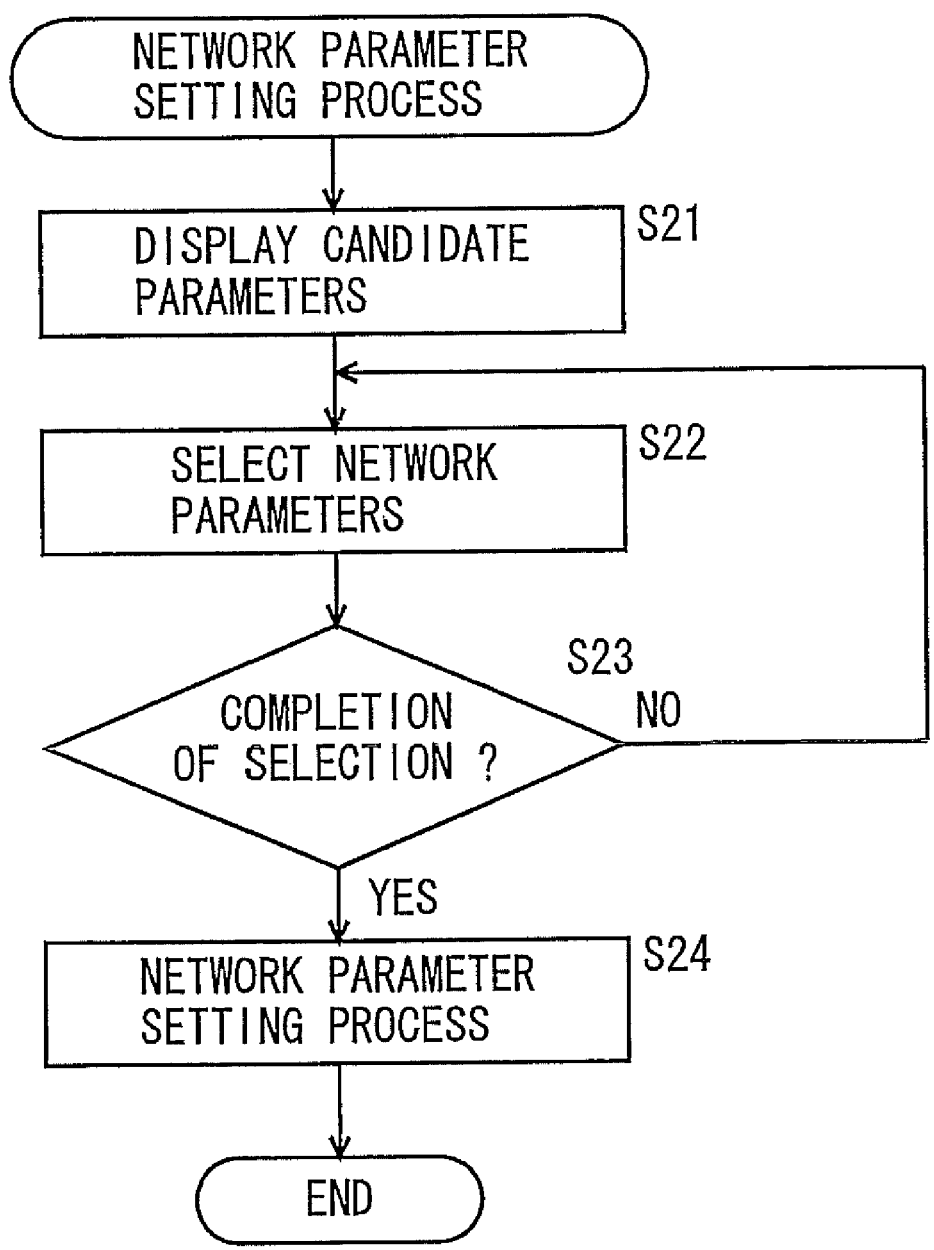
FIG. 9 is a flowchart illustrating the flow of the network parameter setting process which is executed in step S06 of FIG. 6.

FIG. 9 is a flowchart illustrating the flow of the network parameter setting process which is executed in step S06 of FIG. 6. Referring to FIG. 9, in step S21, the candidate parameters temporally stored in step S18 of FIG. 7 are displayed on display unit 107. On display unit 107, the candidate parameters are displayed on a network parameter setting image plane. The candidate parameters include a port number and IP address and therefore IP addresses classified for the respective port numbers are displayed on the network parameter setting image plane. Also, in addition to IP addresses, the host names corresponding to the IP addresses may be acquired from DNS server 2C and displayed.

In step S22, a network parameter selecting instruction is received. This selecting instruction is input by the user through input unit 108. In step S23, it is determined whether or not the reception of the selecting instruction has been completed. Step S22 is repeated until it is determined that the reception of the selecting instruction has been completed. If it is determined that the reception has been completed, the process proceeds to step S24.

In step S24, the network parameter selected in step S22 is stored in network environment storage part 105A.

FIG. 10 is a view illustrating an exemplary network parameter setting image plane displayed on the display unit in the network parameter setting process. Referring to FIG. 10, there is illustrated an example where the IP address of the FTP server having a port number of 21 and the IP address of the SMTP address having a port number of 25, of the candidate parameters, are displayed. By scrolling the image plane, the IP addresses of the other port numbers are displayed.

In the network parameter setting image plane illustrated in FIG. 10, five IP addresses of the FTP server are displayed together with the host names. When the user selects an area displaying an IP address in the image plane; the set of the IP address and the port number is selected. In the figure, the selected sets of a port number and an IP address are hatched. Further, as illustrated in the figure, a plurality of IP addresses can be selected for the FTP server. This is for enabling the follows; when an application program for file transfer is activated later in MFP 1A, all the selected IP addresses are displayed as candidate destinations and an IP address selected from the displayed destinations is specified as the FTP server.

The instruction button indicating the characters of storing of setting is a button for inputting the completion of setting. By selecting this button, the port number and IP address selected from the candidate parameters are stored in network environment storage part 105A as network parameters.

Exemplary Modification of Port Scan Unit

Figure 11:
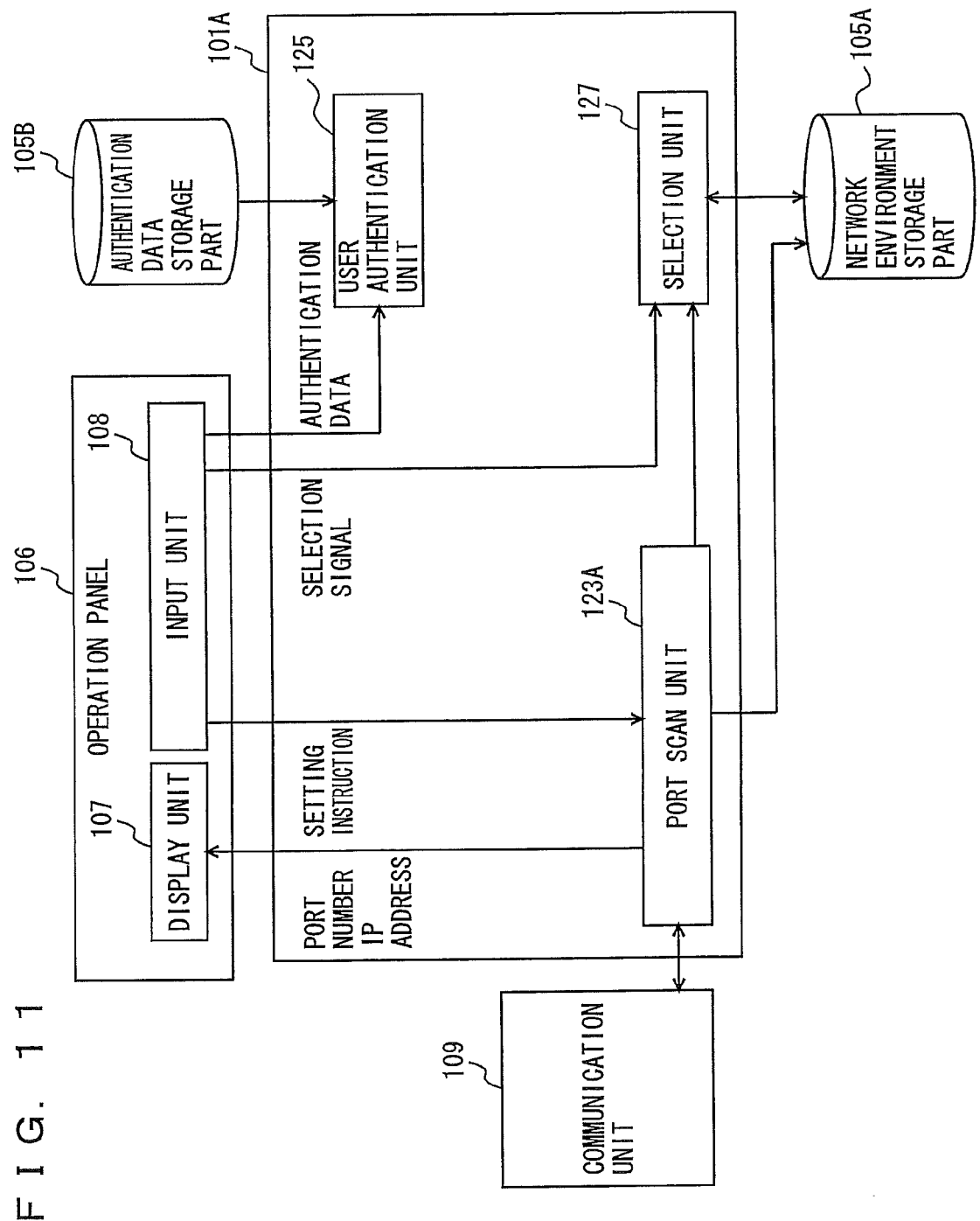
FIG. 11 is a functional block diagram illustrating the detail structure of the control unit 101A including a modified port scan unit applied thereto.

Next, an exemplary modification of port scan unit 123 will be described. FIG. 11 is a functional block diagram illustrating the detail structure of a control unit 101A including the modified port scan unit. This is different from control unit 101 illustrated in FIG. 5 in that scanning range setting unit 121 is eliminated and port scan unit 123 is changed to a port scan unit 123A. Hereinafter, differences between control unit 101A and control unit 101 will be mainly described.

The result of user authentication at user authentication unit 125 is output to port scan unit 123A. Port scan unit 123A performs port scanning which will be described later only when the result of user authentication indicating that the user is a true user was input.

A setting instruction for starting the setting of network environment is input to port scan unit 123A from input unit 108. Port scan unit 123A, in response to the input of setting instruction, acquires packets flowing through network 6A and analyzes them to acquire IP addresses which open the ports corresponding to the port numbers stored in network environment storage part 105A. Then, port scan unit 123A outputs the extracted sets of port number and IP address to display unit 107. Display unit 107 displays the input port numbers and IP addresses for the respective port numbers.

Figure 12:
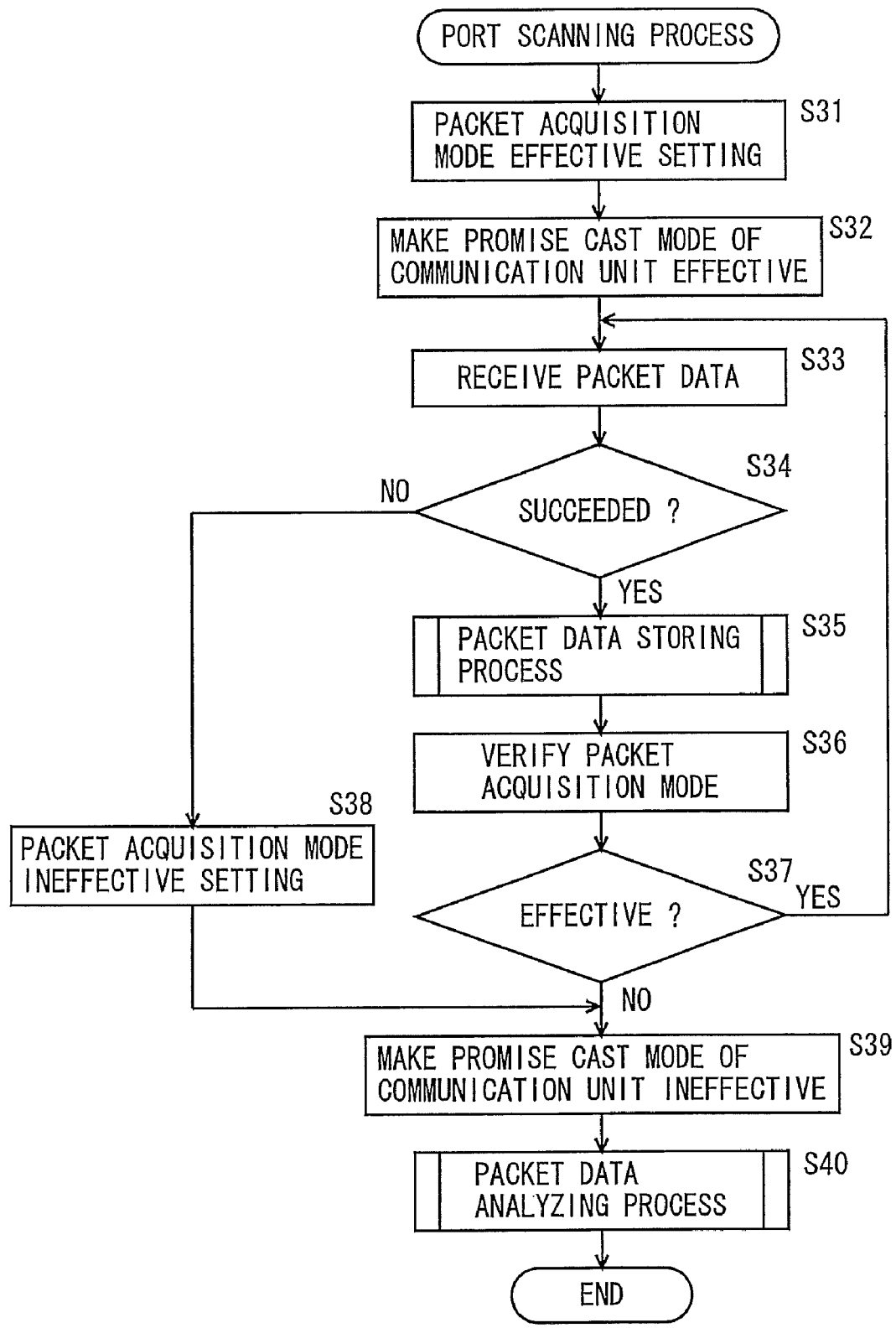
FIG. 12 is a flowchart illustrating another flow of the port scanning process.

FIG. 12 is a flowchart illustrating another flow of the port scanning process. Referring to FIG. 12, port scan unit 123A makes the packet acquiring mode of communicating portion 109 effective (step S31). The time interval in which the packet acquiring mode is effective is predetermined and is 30 seconds herein. Namely, the packet acquiring mode is effective for 30 seconds since the packet acquiring mode is made effective in step S31 and after 30 seconds has elapsed the packet acquiring mode is made ineffective. During the time interval in which the packet acquiring mode is effective, packets are output from communicating portion 109 to port scan unit 123A.

In step S32, a promise cast mode of communicating portion 109 is made effective. While communicating portion 109 usually receives only packets addressed to MFP 1A and outputs them to port scan unit 123, when the promise cast mode is effective it outputs all packets flowing through network 6A to port scan unit 123.

Port scan unit 123A receives packets from communicating portion 109 (step S33) and determines whether or not the receptions were succeeded (step S34). If the receptions were succeeded, the process proceeds to step S35. If not succeeded, the process proceeds to step S38. In step S35, a packet data storing process for extracting IP addresses and port numbers included in received packets is executed.

Then, it is verified whether or not the packet acquiring mode is effective (step S36). Here, the time which has elapsed since the packet acquiring mode was made effective in step S31 is acquired. Then, it is determined whether or not the result of verification is effective (step S37). If the time which has elapsed since the packet acquiring mode was made effective is within 30 seconds, it is determined that the packet acquiring mode is effective and the process returns to step S33. If it is determined that the packet acquiring mode is ineffective, the process proceeds to step S39.

On the other hand, in step S38, the packet acquiring mode is made ineffective even if the time which has elapsed since the packet acquiring mode was made effective is within 30 seconds. Then, the process proceeds to step S39.

In step S39, the promise cast mode of communicating portion 109 is made ineffective. Communicating portion 109 usually receives only packets addressed to MFP 1A and outputs them to port scan unit 123.

Then, a packet data analyzing process for analyzing IP addresses and port numbers extracted in the packet data storing process executed in step S35 is executed.

Next, packet data will be described. FIG. 13 is a view illustrating an example of packet data flowing through network 6A. In the figure, the data is given in hexadecimal notation and arbitrary one byte is designated by a symbol of *. FIG. 14 is a view illustrating exemplary format of packet data. Referring to FIG. 14, the 13th byte and 14th byte, from the head, of the packet data designate the type of the protocol, and the 24th byte, from the head, of the packet data designates the type of the protocol in IP. Further, the 27th byte to 30th byte, from the head, of the packet data designate the source IP address, and the 31st byte to 34th byte, from the head, of the packet data designate the destination IP address. Further, the 35th byte to 36th byte, from the head, of the packet data designate the source port number, and the 37th byte and 38th byte, from the head, of the packet data designate the destination port number.

In the packet data illustrated in FIG. 13, the type of the protocol is 0x0800, which designates the IP protocol, and the type of the protocol in the IP is 0x06, which designates the TCP protocol. The destination IP address is 0xC0A80D0A, which designates 192.168.100.10 in decimal number. The source IP address is 0xC0A80D14, which designates 192.168.100.20 in decimal number. The source port number is 0x006E, which designates the 110th port in decimal number. The destination port number is 0x0400, which designates the 1024th port in decimal number. In packet data, the type of protocol, the type of protocol in the IP, the source IP address, the destination IP address, the source port number and the destination port number are designated by predetermined codes in predetermined positions.

In the packet data storing process, according to the format of packet data, the source address, the destination address, the source port number and the destination port number are extracted from a packet of TCP/IP (Transmission Control Protocol/Internet Protocol) protocol and are temporally stored.

Figures 15, 16:
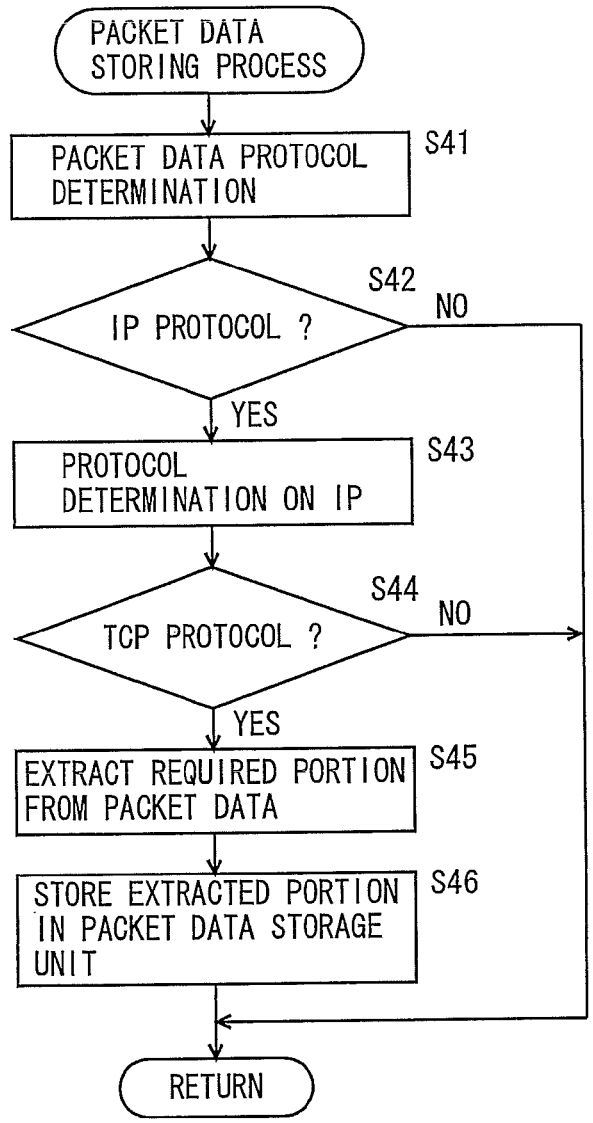
FIG. 15 is a flowchart illustrating the flow of the packet data storing process which is executed in step S35 of FIG. 12.
FIG. 16 is a view illustrating an example of data stored in the packet data storage unit.

FIG. 15 is a flowchart illustrating the flow of the packet data storing process which is executed in step S35 of FIG. 12. Referring to FIG. 15, the protocol of packet data is determined from the data of the 13th byte and the 14th byte (step S41). Then, it is determined whether or not it is the IP protocol (step S42). If it is the IP protocol, the process proceeds to step S43. If not, the process ends. Namely, only packets of the IP protocol will be processed.

In step S43, the protocol in the IP is determined from the data of the 24th from the head (step S44). If it is the TCP protocol, the process proceeds to step S45. If not, the process ends. Namely, only packets of the TCP protocol will be processed.

Then, from the packet data, the source IP address, the destination IP address, the source port number and the destination port number are extracted (step S45) and the source IP address, the destination IP address, the source port number and the destination port number which have been extracted are temporally stored in the packet data storage unit included in port scan unit 123 (step S46). The packet data storage unit is a volatile semiconductor memory such as a random access memory (RAM).

FIG. 16 is an example of data stored in the packet data storage unit. In the figure, there are illustrated sources IP addresses, destination IP addresses, source port numbers and destination port numbers which have been extracted from two packets.

Figure 17:
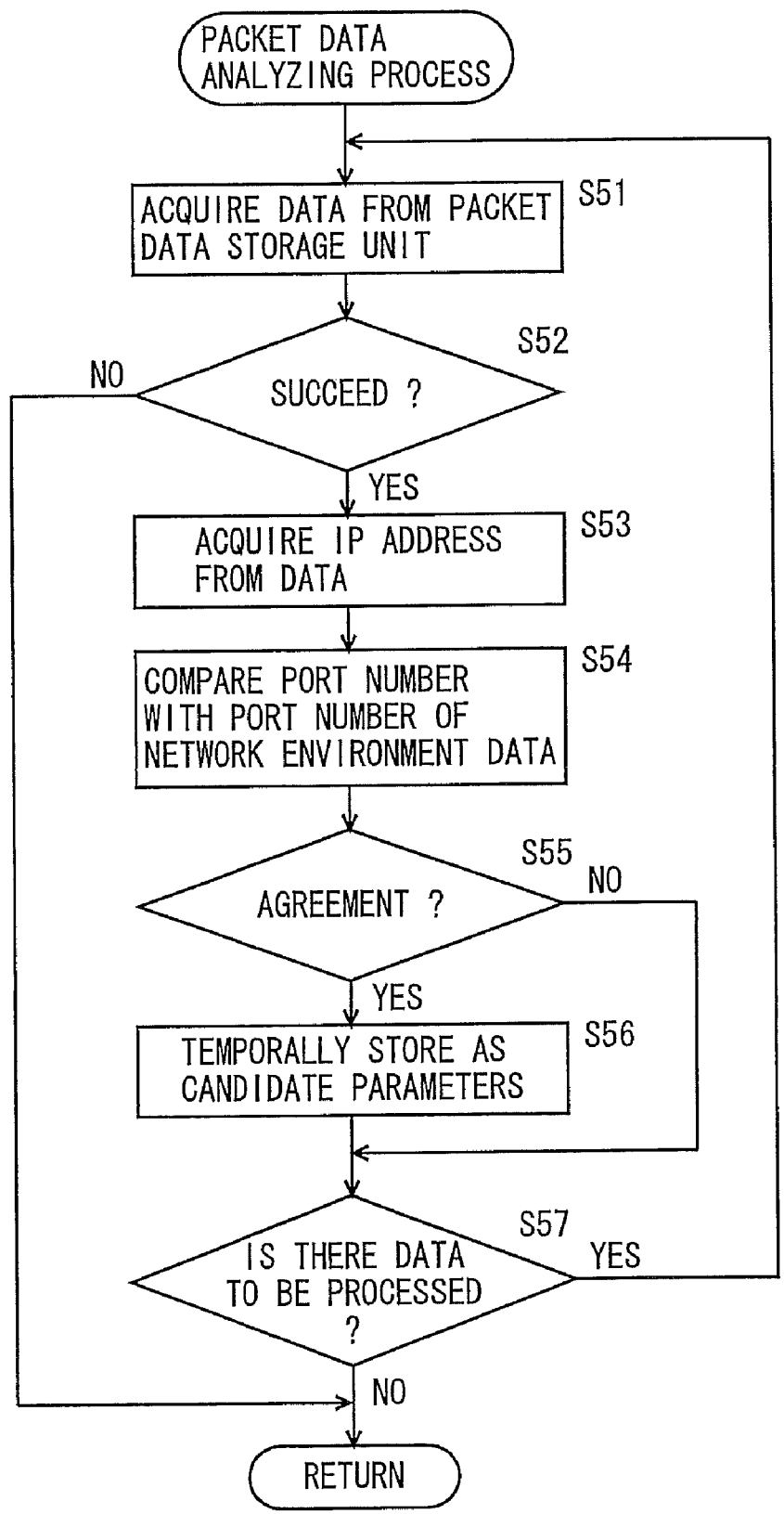
FIG. 17 is a flowchart illustrating the flow of the packet data analyzing process which is executed in step S40 of FIG. 12.

FIG. 17 is a flowchart illustrating the flow of the packet data analyzing process which is executed in step S40 of FIG. 12. Referring to FIG. 17, the source IP address, the destination IP address, the source port number and the destination port number extracted from a single packet are acquired from the packet data storage unit (step S71). It is determined whether or not the acquisition was succeeded (step S52). If the acquisition was succeeded, the process proceeds to step S53. If not, the process ends. Then, sets of an IP address and a port number are acquired from the acquired data. As illustrated in FIG. 16, for a single packet, a set of the source IP address and source port number and a set of the destination IP address and destination port number are stored. Therefore, two sets of an IP address and port number are acquired.

In step S54, the acquired port numbers are compared with the port numbers of network data stored in network environment storage part 105A. Then, the result of comparison is determined (step S55). If the comparison revealed that the both are in agreement, the process proceeds to step S56. If not in agreement, the process skips step S56 and proceeds to step S56.

In step S56, sets of an IP address and a port number which agrees with any one of port numbers of network data is temporally stored as candidate parameters.

In step S57, it is determined whether or not there is data which has not been processed. If there is, the process returns to step S51. If not, the process ends.

As previously described, MFP 1A according to the present embodiment acquires the IP addresses of apparatuses which open a predetermined port, of the other apparatuses connected to LAN. MFP 1A stores the selected set of an IP address and a port number if a set of an IP address and a port number displayed is selected. Therefore, even if the IP addresses of the apparatuses having a predetermined port open are unknown, the IP addresses required for communicating with the apparatuses can be set.

Further, since one or more ports are set as the predetermined port, the destinations of communication can be set for respective ports used for applications.

Port scanning is performed for all IP addresses in a predetermined range for each predetermined port, and therefore the port scanning will not be performed for apparatuses with which communication will not be performed. Therefore, wasteful utilization of network source can be prevented.

Further, packets flowing through a network are received and the received packets are analyzed to extract the port numbers and IP addresses of predetermined ports, and therefore IP addresses can be acquired for respective port numbers without sending data to the network.

Further, packets in accordance with a predetermined protocol are selected from the received packets and if the port numbers included in the selected packets agree with the port numbers of predetermined ports, the IP addresses included in the packets are extracted. Therefore, IP addresses can be infallibly acquired.

Further, packets are received within a predetermined time interval, and therefore the IP addresses of apparatuses which send packets within the time interval can be acquired.

The IP addresses are set on condition that an instruction for execution is given from outside, and therefore unnecessary update of the setting will not be performed.

Further, the execution instruction is an instruction for an initial setting, and therefore the setting of IP address for ports will not be performed when it is not required. More specifically, the setting of IP address for ports may be performed when the MFP is installed, or when an apparatus with which the MFP will communicate is connected to a network.

While in the present embodiment there has been described MFP 1A, it will be apparent to those skilled in the art that the present invention is applicable to a printer, a computer, a gateway which can be connected to a network, as well as MFP 1A. Further, the present invention is applicable as a network parameter setting method or a network parameter setting program which is executed in an apparatus connectable to a network.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication device connected to a network comprising:
   an IP address acquisition unit for acquiring an IP address of an apparatus having at least one predetermined port open from one of apparatuses connected to said network; and
   a storage unit for storing a set of said acquired IP address and a port number of said at least one predetermined port, wherein
   said IP address acquisition unit performs port scanning for all IP addresses in a predetermined range for said at least one predetermined port.

2. The communication device according to claim 1, further comprising:
   an input unit for inputting said predetermined range.

3. The communication device according to claim 2, wherein
   IP addresses in said predetermined range are specified at a subnet of
   said network.

4. The communication device according to claim 1, further comprising:
   a display unit for displaying a set of said acquired IP address and said port number of said at least one predetermined port; and
   a selection reception unit for receiving a selection of said displayed set of said acquired IP address and said port number, wherein
   said storage unit stores said selected set of said acquired IP address and said port number.

5. The communication device according to claim 4, wherein
   said display unit displays, instead of said IP address or together with said IP address, a name of said apparatus assigned said acquired IP address.

6. The communication device according to claim 1, wherein
   said at least one port corresponds to at least one of FTP server, SMTP server, DNS server POP3 server and LDAP server.

7. The communication device according to claim 1, further comprising:
   an execution instruction reception unit for receiving an execution instruction input from outside, wherein
   said IP address acquisition unit acquires said IP address if said execution instruction is input.

8. The communication device according to claim 7, further comprising:
   an authentication code reception unit for receiving an authentication code, wherein
   said execution instruction reception unit receives an execution instruction on condition that said received authentication code is a predetermined authentication code.

9. The communication device according to claim 7, wherein
   said execution instruction is an instruction for an initial setting.

10. The communication device according to claim 1, wherein said at least one predetermined port is publicly determined.

11. The communication device according to claim 1, wherein
    said storage unit is referred to by an application program, in order that the application program determines apparatuses with which it will communicate.

12. The communication device according to claim 11, wherein
    said application program acquires an IP address corresponding to a port number.

13. An image formation device comprising:
    the communicating device according to claim 1; and
    an image formation unit for generating images.

14. A method for a communication device connected to a network comprising:
    acquiring an IP address, by an IP address acquisition unit of said
    communication device, of an apparatus having a predetermined port open from one of apparatuses connected to said network; and
    loading a set of said acquired IP address and a port number of said predetermined port, wherein
    said acquiring an IP address of an apparatus includes performing port scanning for all IP addresses in a predetermined range for said predetermined port.

15. A non-transitory computer-readable recording media storing thereon a program for
    implementing a method for a communication device, said program causing said communication device to execute:
    acquiring an IP address of an apparatus having a predetermined port open from one of apparatuses connected to said network; and
    loading a set of said acquired IP address and a port number of said
    predetermined port, wherein
    said acquiring an IP address of an apparatus includes performing port scanning for all IP addresses in a predetermined range for said predetermined port.

* * * * *